April 5, 1927.
C. B. KINGSLEY
1,623,057
BATCH FEEDING TO GLASS TANKS
Filed May 14, 1925
2 Sheets-Sheet 1
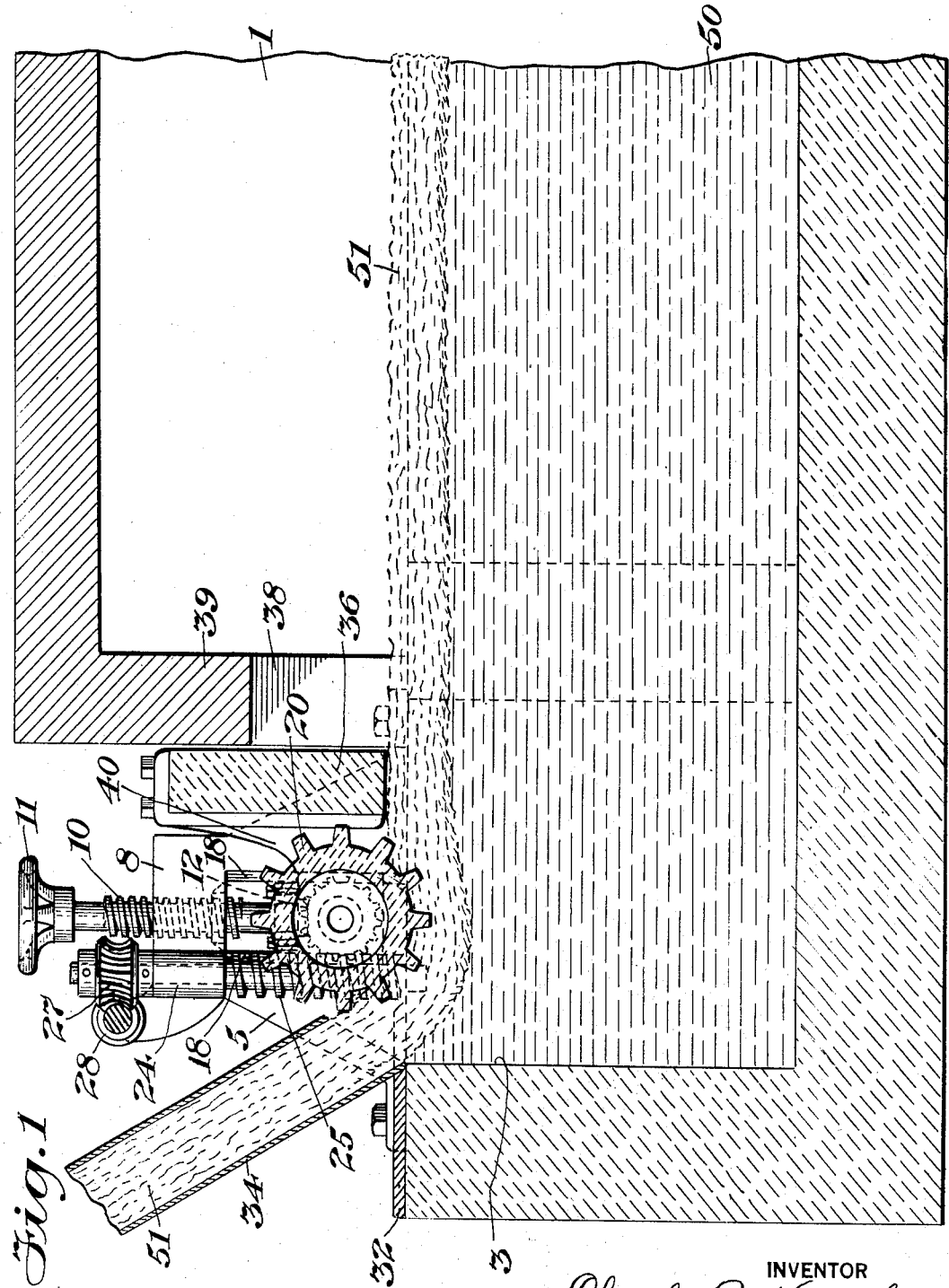
INVENTOR
Charles B. Kingsley
BY
Cooper, Kerr & Dunham
HIS ATTORNEYS April 5, 1927.  
C. B. KINGSLEY  
1,623,057  
BATCH FEEDING TO GLASS TANKS  
Filed May 14, 1925  2 Sheets-Sheet 2
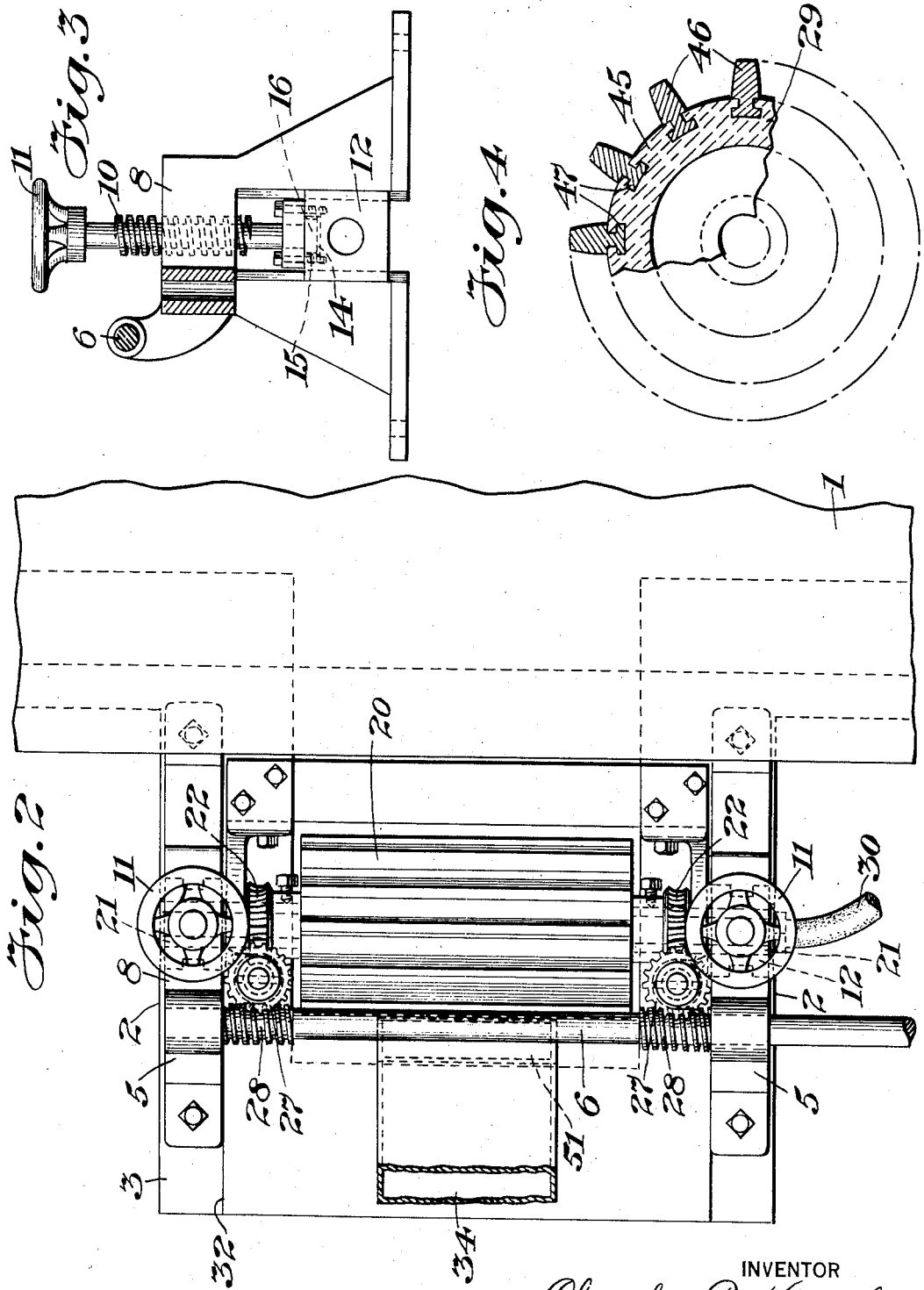
INVENTOR  
Charles B. Kingsley  
BY  
HIS ATTORNEYS Patented Apr. 5, 1927.

1,623,057

UNITED STATES PATENT OFFICE.

CHARLES BROWN KINGSLEY, OF CLAIRTON, PENNSYLVANIA, ASSIGNOR TO MISSISSIPPI GLASS COMPANY, A CORPORATION OF NEW YORK.

BATCH FEEDING TO GLASS TANKS.

Application filed May 14, 1925. Serial No. 30,148.

My present invention relates to method of and apparatus for the continuous feeding of batch or glass making mixtures to glass furnaces or tanks as the glass is molten and drawn from the furnace.

According to my invention I provide means for continuously feeding the cullet from the storage bin or suitable feed hopper comprising a conduit or closed top chute which discharges through an opening in a cover on the dog house or receiving troughs of the tank at a point near means preferably in the form of a paddle wheel which serves both to impel the cullet into the molten glass and also to close the discharge end of the chute and prevent the raising of dust during the feeding.

The feeding paddle in the preferred form is a hollow cylinder which is provided with means for passing a current of air or water therethrough for the cooling of the cylinder and of lugs formed thereon which serve as paddles. In one embodiment of my invention I make the lugs detachable from the cylinder for the renewal thereof and for the providing of fins of a size most suitable for feeding the batch at desired rates.

The feeding paddle is furthermore mounted for adjustment vertically across the discharge end of the feeding chute for the purpose of accommodating it to the level of metal in the tank and for securing the best feeding relation between it, the metal level and the batch at a given rate of feed to the paddle wheel. For the continuous operation of the wheel without interruption during adjustment a worm and pinion drive is provided with a pinion on each end of the wheel shaft and movable vertically while in continued engagement each with its respective worm.

In the drawings forming part of this application:

Fig. 1 is an elevation view in section of part of a glass melting tank at the feeding end thereof with a chute discharging into the receiving trough or dog house and a mixing paddle mounted between the chute and the shear cake of the tank, with means for raising and lowering the mixing paddle and for transmitting rotary motion thereto permitting such raising or lowering without interruption of such rotation, Fig. 2 is a plan view of part of a glass melting tank showing the feeding trough and other apparatus of Fig. 1, Fig. 3 is a vertical elevation of the supporting means for the mixing paddle and of the means for raising and lowering it, and Fig. 4 is a diagrammatic view of the end of a mixing paddle wheel having replaceable paddles.

In the drawings the melting tank 1 carries on the side walls 2, 2 of the feeding trough or dog house 3 thereof the bearing brackets 5, 5 which carry between them the drive shaft 6 which connects to suitable driving mechanism not shown. Said brackets 5, 5 each have extending vertically through the horizontal arms 8, 8 thereof the supporting posts 10, 10 which have screw engagement with their respective arms 8, 8 and which are movable vertically through said screw connecting by means of the respective hand wheels 11, 11.

At their lower ends said posts 10, 10 carry the bearing boxes 12, 12 with which they have connection which permits rotation of the posts therein, said connection comprising the recess 14 having the inset surface 15 which engage the flange 16 on each of the posts 10 (see Fig. 3). At their lateral edges said boxes 12, 12 engages the vertical surfaces 18, 18 formed within the confines of the brackets 5, 5 which serve as guideways for the boxes.

Between said boxes 12, 12 hangs the paddle wheel 20 the bearing shafts 21, 21, at each end of which extends through the respective boxes and which carry between the ends of the paddle 20 and the respective boxes 12, 12 the pinions 22, 22. Extending vertically through each of the arms 8, 8 between the posts 10, 10 and the shaft 6 are the shafts 24, 24 rotatable in said arms and carrying below said arms the worm gears 25, 25 which engage the respective pinions 22, 22. At their upper ends said shafts 24, 24 carry the pinions 27, 27 which engage respective worm gears 28, 28.

Said bearing shafts 21, 21 are hollow as is also the cylindrical roll 29 of the paddle wheel 20 for the purpose of permitting the circulation through said cylinder of a cooling medium such as water or air fed thereto as by means of the flexible hose 30.

With the opening 31 in the cover 32 provided on the front of said trough 3 there registers the lower end of the feed chute 34, all at a point substantially opposite the middle of wheel 20. The upper end of chute 34 connects with a suitable bin or feed hopper not shown.

A shear cake 36 is provided across the opening 38 formed in the back wall 39 of tank 1 and in the frequent embodiment of my invention as shown in the drawings is mounted for vertical movement with the roller or wheel 20 by means of brackets 40, 40 mounted to said boxes 12, 12, the lower edges of said shear cake 36 being fixed at a distance slightly above the lower limit of the paddles on wheel 20. It is to be understood however that when desired said shear cake is made adjustable separately from wheel 20 as by means of a rope and pulley in the manner commonly used on glass tanks.

In Fig. 4 is shown diagrammatically an alternate embodiment of the paddle wheel used in my invention comprising a hollow cylinder 45 having the removable paddles 46, 46 mounted about the periphery thereof in the dovetail grooves 47, 47.

In the use and operation of the method and apparatus of my invention and with molten metal or glass 50 in tank 1 up to a level near the top edge of trough 3 and during the constant or intermittent tapping or drawing of molten glass from the furnace a constant stream of cullet or raw glass mix 51 is fed through chute 34 at a rate commensurate with that at which the glass melt is withdrawn over a given period of time, the wheel 20 being driven for the impelling of the cullet down into the glass melt and forwardly under shear cake 36 into the furnace 1 where it will melt and coalesce with the glass 50 already molten therein. The wheel 20 by means of hand wheels 11, 11 is adjusted vertically to conform with the level of the melt 50 in the tank as it varies in level through intermittent tapping. During the use of the wheel 20 for mixing the cullet with molten glass and feeding it into the furnace a stream of air is passed therethrough to keep its temperature from being raised too high by heat from the furnace 1. By constant feeding above and in the claims following is meant constant or continuous throughout, during and between, a series of intermittent tapping of glass from the furnace or throughout and during all or part of a continuous tapping from the furnace.

I claim:—

1. In combination with a glass melting tank means for the continuous feeding of mix to the tank and means for impelling the new mix into the body of molten glass already in the tank.

2. In combination with a glass melting tank means for the continuous impelling of new mix into the body of molten glass already in the tank and forwardly along the surface of such body.

3. In combination with a glass melting tank means for the continuous impelling of new mix into the body of and forwardly along the surface of molten glass already in the tank, and means for raising and lowering said impelling means.

4. In combination with a glass melting tank, a mix feeding paddle wheel mounted to be partly immersed in molten glass in said tank, and means for rotating said wheel.

5. In combination with a glass melting tank, a paddle wheel mounted to be partly immersed in molten glass in said tank, means for rotating said wheel, and means for feeding glass batch to the tank at said wheel.

6. In combination with a glass melting tank, a mix feeding paddle wheel mounted to be partly immersed in molten glass in said tank, means for rotating said wheel, and means for adjusting the level of said wheel in said tank.

In testimony whereof I hereto affix my signature.

CHARLES BROWN KINGSLEY.